J. BLAUSTEIN.
TOOL GUIDING JIG.
APPLICATION FILED JUNE 19, 1917.

1,293,009.

Patented Feb. 4, 1919.
4 SHEETS—SHEET 1.

WITNESS
Howard P. King

INVENTOR:
Joseph Blaustein,
BY
Marble & Everett,
ATTORNEYS.

J. BLAUSTEIN.
TOOL GUIDING JIG.
APPLICATION FILED JUNE 19, 1917.

1,293,009.

Patented Feb. 4, 1919.
4 SHEETS—SHEET 2.

WITNESS
Howard P. King

INVENTOR:
Joseph Blaustein
BY
Marble + Everett
ATTORNEYS.

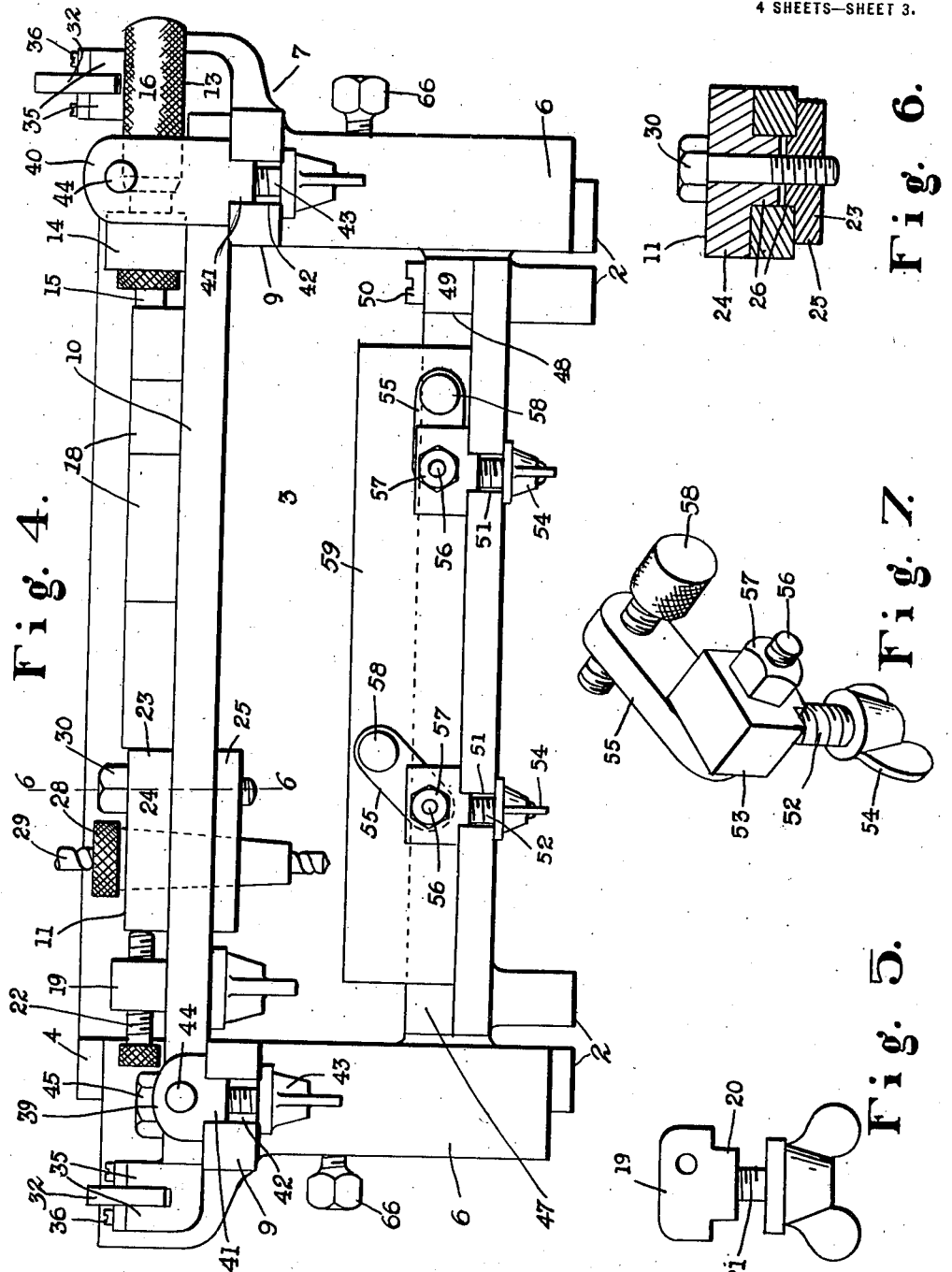

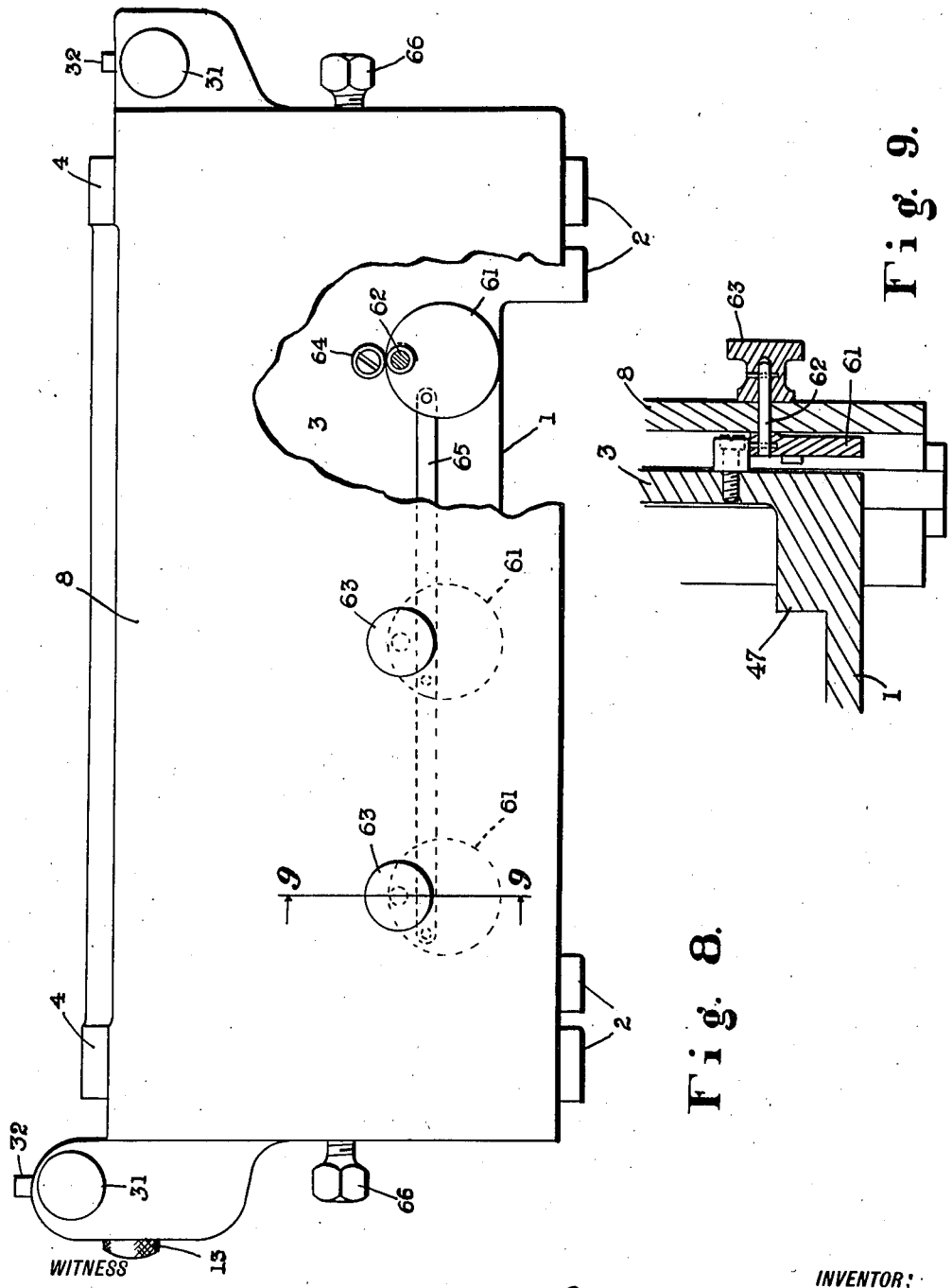

UNITED STATES PATENT OFFICE.

JOSEPH BLAUSTEIN, OF NEWARK, NEW JERSEY.

TOOL-GUIDING JIG.

1,293,009.  Specification of Letters Patent.  Patented Feb. 4, 1919.

Application filed June 19, 1917. Serial No. 175,582.

*To all whom it may concern:*

Be it known that I, JOSEPH BLAUSTEIN, a citizen of the United States of America, and a resident of Newark, in the county of Essex and State of New Jersey, have invented new and useful Improvements in Tool-Guiding Jigs, of which the following is a specification.

The objects of this invention are to provide improved means for temporarily guiding a tool, such as a drill, reamer, file, milling cutter or the like held and operated in its appropriate machine, in relation to a work piece so that said relation can be accurately and positively adjusted as desired to enable the tool to operate successively upon different parts of the work; to hold the work clamped always in fixed position and adjust the tool guide in any direction with respect to the tool; to provide upon the work support shoulders against which the sides of the work, as at right angles to each other, may be clamped, said shoulders forming base lines from which the desired distances may be laid off as ordinates and abscissas to position the tool guide; to provide micrometers for adjustment and at the same time permit the part adjusted to move independent of said micrometers; to provide means for securing an approximate adjustment prior to the final exact adjustment by micrometer; to enable the tool guide to be brought closer to or moved away from the work support and thus positioned close to the work; to provide means for clamping the work on the work support which can be adjusted to engage the work at the best point thereof, and to obtain other advantages and results as may be brought out in the following description.

Referring to the accompanying drawings, in which like numerals of reference indicate the same parts throughout the several views, Figure 1 is a plan of a jig embodying my invention;

Fig. 4 is an elevation looking at the jig from the right-hand side of Sheet 1;

Fig. 5 is a detail elevation of a certain clamp post removed from its place on the bridge;

Fig. 6 is a cross-sectional view of the guide block and bridge on line 6—6 of Fig. 4;

Fig. 7 is a detail perspective view of certain clamping means for the work;

Fig. 8 is an elevation looking at the jig from the left-hand side of Sheet 1, and with part of the back wall broken away, and Fig. 9 is a cross-sectional view on line 9—9 of Fig. 8.

Figure 1:
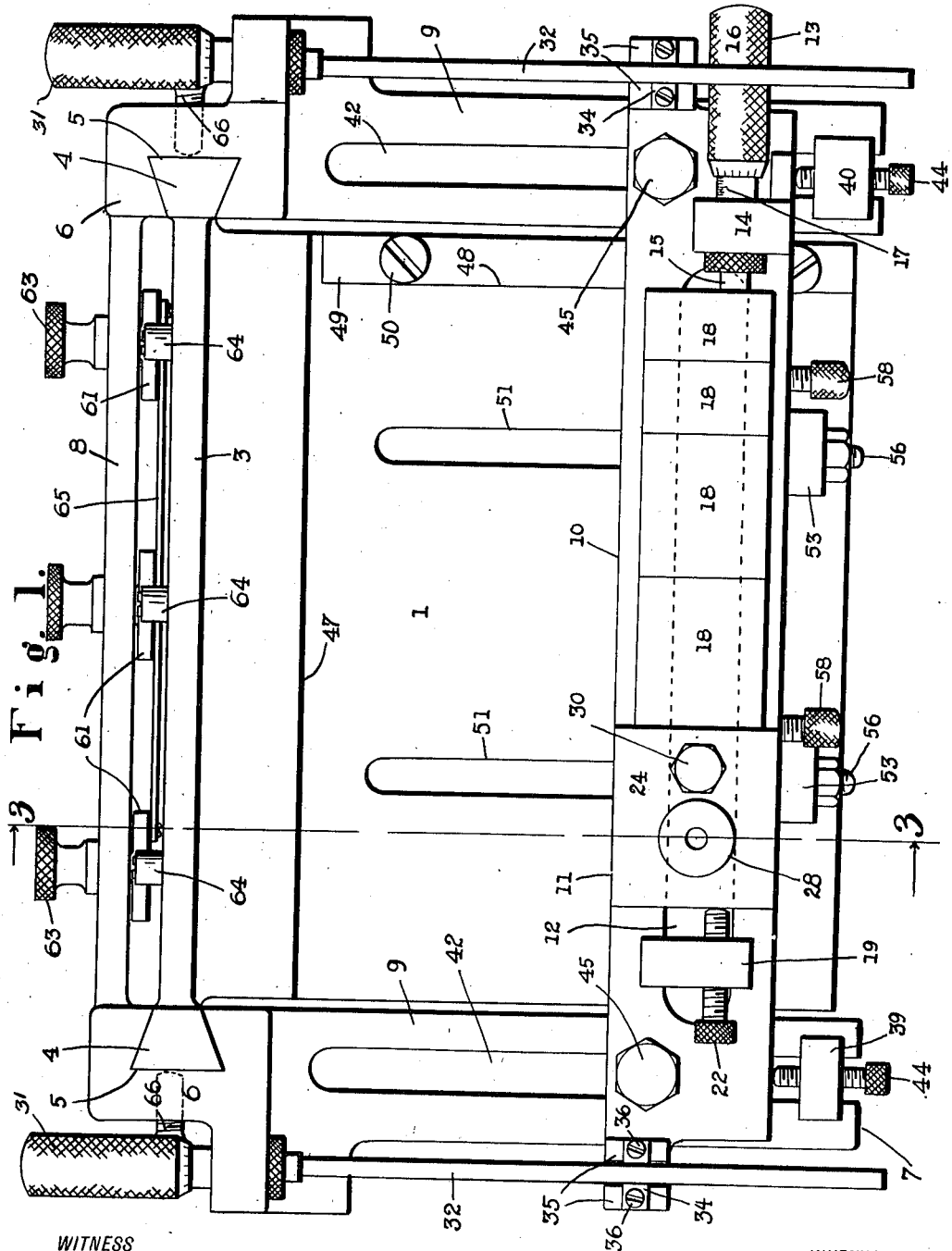

In the specific embodiment of the invention illustrated in said drawings, the reference numeral 1 indicates a base or work support having feet 2 by means of which it is supported in horizontal position upon the table of a drill press or other machine (not shown) where the jig is to be used. Along one longitudinal edge of this base is an upwardly projecting back wall 3 providing at its opposite ends upright tracks or gibs 4, 4 adapted to slidably engage slideways 5, 5 provided in uprights 6, 6 of a tool guide carrier, above said work support 1, and preferably parallel thereto. By this means described, vertical adjustment of said carrier may be obtained with respect to the work support or base as may be desired to position the tool guide close to the work and thus prevent lateral deflection and inaccuracy. It will be understood that the entire device is usually employed by simply setting it upon the table of a drill press or the like, which is then operated to drill a hole, the device adjusted for the drilling of the next hole, and so on. The piece of work being drilled is clamped upon the work support 1, as will be hereinafter more fully described, and the tool guide carrier is parallel thereto, its adjustment vertically being such as to prevent any other variation with relation to the work support. The tool guide, as will be hereinafter described, is adjustable upon the tool guide carrier in any direction in its plane and thus in any direction parallel to the work support.

The tool guide carrier 7 preferably provides a body comprising a back wall 8 having the uprights 6 at its ends integral therewith, and arms 9, 9 projecting perpendicularly from said back wall above the work support and preferably parallel to each other. A bridge 10 between said arms 9, 9, rests on the top of the same for support, and said bridge is adjustable transversely of itself on said arms so that it may be moved toward or away from the back wall as desired. Carried by said bridge 10 is a tool guide 11 which moves with said bridge and which is also movable longitudinally of said bridge, whereby said tool guide may be adjustably positioned in two directions at right angles to each other. In this way ordinate and abscissa dimensions may be laid off by moving the bridge and the tool guide away from base lines to distances corresponding to said dimensions; the tool guide will then position the tool at the proper place, and where a plurality of such places are to be operated upon, they can be very readily and accurately spaced from each other by properly positioning the bridge and tool guide.

Describing now the parts of the present disclosure in greater detail, the bridge 10 is preferably provided with a longitudinal slot 12. At one end of the bridge is a micrometer 13 held in a lug 14 projecting upwardly from the top of said bridge, it being understood that the extensible plunger 15 of said micrometer is movable longitudinally of the bridge and slot and by turning the handle or knob 16 said plunger is projected or retracted definite amounts, which may be read upon suitable graduations or scale 17 as usual. Preferably the micrometer plunger 15 has a limited range of extension, and in order to locate the tool guide at greater distances, suitable spacing means are provided, such as the several blocks or fillers 18 which may all be of unit length or multiples thereof. For example, if it is desired to space the bridge block five and one-half inches from the base line, unit blocks may be employed to make up the five inches and the micrometer employed to accurately obtain the fractional part or the half-inch referred to. It should be particularly noted that the micrometer is not intended to shift the tool guide, but is arranged to determine the proper distance and then the tool guide brought against it or against the interposed spacing blocks and clamped in that position. By this construction, the micrometer is used for measuring purposes only and consequently is not subjected to so much wear, and retains its accuracy.

Means are preferably provided for retaining the tool guide against the micrometer or interposed spacing blocks in proper position while said tool guide is being clamped securely in place. The means herein shown provide a clamp post 19 having a depending foot 20 adapted to enter said longitudinal slot 12 of the bridge and permit said post to be moved longitudinally of the bridge but hold said post both from lateral displacement and from twisting. A clamping screw 21, shown as having a winged head for conveniently manipulating it, is threaded into the bottom of said post 19, the screw passing through the slot 12 in the bridge and the head of the screw underlying the bridge adjacent the slot, so the post may be clamped securely upon the bridge. A set screw 22 extending toward the drill guide is threaded transversely through said post, and after the tool guide is positioned against the micrometer screw or interposed spacing blocks, the post 19 is moved adjacent to it and clamped by its screw 21 and then the set screw 22 is turned into engagement with the tool guide, holding it firmly toward the micrometer against any inadvertent displacement.

The tool guide preferably comprises a block 23 made up of an upper plate 24 and a lower plate 25, one or both of said plates having longitudinal ribs 26 adapted to enter the longitudinal slot 12 of the bridge to permit movement of said tool guide longitudinally of the bridge without lateral displacement and twisting. Extending downwardly through the block is a tapered hole 27 passing through the block within the slot 12 of the bridge and in this hole is positioned a removable bushing 28 through which the tool 29 may be inserted and by which it is both guided and prevented from bending. In conjunction with each jig there are a plurality of bushings so that one may be substituted for another where a larger or smaller tool is to be used, and also the bushings may be of various lengths so that for any piece of work a bushing may be used the lower end of which will be close to the work regardless of how close the upper member or tool guide carrier of the jig is brought to the work support. Adjacent the bushing 28 is a clamping bolt 30 which also passes downward through the block 23 and slot 12 of the bridge, and which is threaded into the lower plate 26 so as to clamp it upwardly and the upper plate downwardly toward the bridge which is thus gripped therebetween. After the tool guide has been positioned by the micrometer and set screw 22, said clamping bolt 30 is tightened and the guide block is thereby prevented from any longitudinal movement with respect to the bridge so that in drilling a hole or otherwise operating upon the work the micrometer screw does not carry any of the strain.

Figure 2:
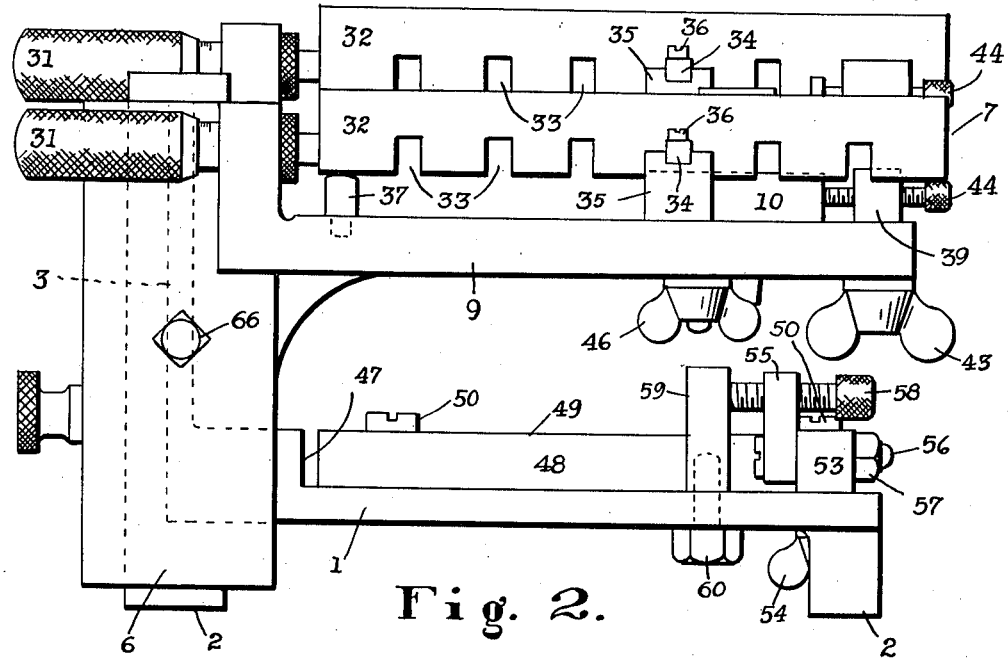
Fig. 2 is an elevation looking at the left-hand end of Fig. 1.
Figure 3:
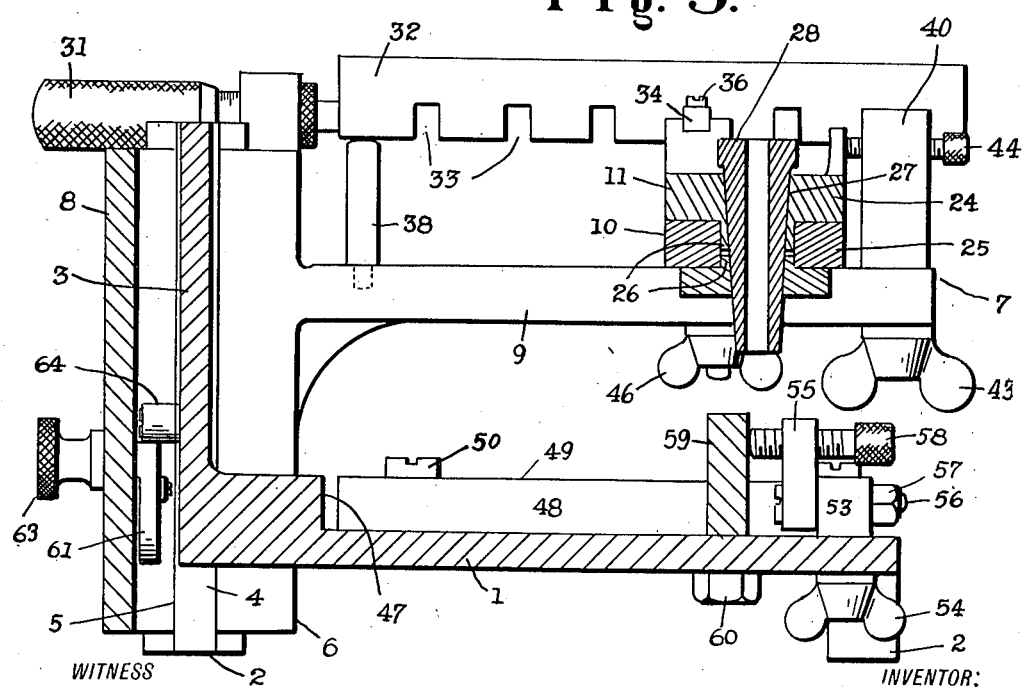
Fig. 3 is a cross-sectional view on line 3—3 of Fig. 1.

The bridge is adjustable transversely of itself upon the supporting arms 9, 9 at its opposite ends, and preferably there are also micrometers 31, 31, one for each end of the said bridge whereby said bridge is positioned the proper distance outwardly along said arms and in exact parallel relation to the other base line from which the work is laid out. As shown, the micrometers 31 are carried by the uprights 6, 6 at the outer sides of the arms 9, 9, respectively, and substantially parallel to said arms. For spacing the bridge unit distances or multiples of unit distances from the micrometers, I have shown in this instance spacing bars 32, 32, one for each micrometer and having a plurality of notches 33 extending upwardly from their lower edges adapted to take over pins 34 fast upon the bridge at opposite ends thereof. In operation the micrometers are set to take care of the fractional part of the dimension and then with the ends of the spacing bars engaging the ends of the micrometer plungers and the proper notches taking over the pins 34, said spacing bars 32 take care of the rest of the dimension. As shown, the pins 34 are carried each between ears 35, 35 extending upwardly from the bridge, screws 36, 36 preferably attaching the pins to the lugs and it will be understood that the spacing bars in being applied to the pins are inserted between said ears. Underlying the ends of the spacing bars 32 adjacent the micrometers, are studs 37, 38 by means of which said spacing bars are held at the proper elevation so as to be substantially parallel to the arms 9, 9. It may be here noted, that one of the spacing bars is shown at an elevation above the other, see Fig. 2, and this is to permit the micrometer on the bridge to pass under said elevated spacing bar.

Clamping posts 39, 40 are provided upon the arms 9, 9 at the opposite side of the bridge from the micrometers, these posts having feet 41 entering slots 42 which extend longitudinally of the arms. Clamping screws 43 extend upwardly through said slots into the bottom of said posts and may be loosened or tightened for releasing or clamping the posts with respect to the arms. Also, set screws 44 are threaded transversely through said posts, that is, parallel to the slots in the arms, and after the posts have been positioned adjacent the bridge and clamped, said set screws 44 may be turned to hold the bridge with respect to the micrometer. Clamping bolts 45, 45 extend downwardly throrgh the bridge and slots 42, 42 in the arms, wing nuts 46 being shown upon the lower ends of these bolts below the arms, whereby the bridge may be securely clamped in place upon the arms after it is set. Obviously by the pair of micrometers at its opposite ends, the bridge may be positioned very exactly in parallel relation to the base line.

For establishing the base lines referred to the work support 1 has, preferably parallel to and adjacent its back wall 3, a shoulder 47 against which the work is to be clamped and which represents one base line or ordinate from which the measurements are taken. This shoulder I have shown as an integral part of the work support, although obviously it could be otherwise if desired. At right angles to said shoulder 47 and preferably at the end of the jig under the micrometer end of the bridge, is another shoulder 48 representing the other base line from which measurements are taken. This last-mentioned shoulder I have shown as the upright side of a cleat 49 secured upon the support by suitable screws 50.

In order to clamp the work in position upon the support 1, I have shown said support slotted as at 51, 51 perpendicular to the first-mentioned shoulder 47. Depending through said slots are clamping screws 52, 52 fast with respect to slide-blocks 53 and adapted to clamp said blocks at adjusted positions longitudinally of said slots by means of wing nuts 54, 54 bearing against the under side of the support. To each slide block is pivoted an arm 55 adapted to swing in a plane transverse to the slot, the pivot preferably being a screw 56 extending through the block and arm so a nut 57 on the opposite side of the block from said arm may be tightened to hold the arm at whatever angle it is placed. At the outer end of each arm and extending transversely therethrough is a thumb screw 58 adapted to engage the work. Thus for work of irregular shape, the arms 55 may be swung so their thumb screws 58 will engage it at suitable points, within the range of said arms. When so desired, a cleat 59 may be interposed between the thumb screws 58 and the work, and this cleat may also be secured to the table by bolts 60 extending upwardly into it through the slots in the table.

In order to move the tool guide carrier away from the work support in parallel relation thereto, lifting means are provided adjacent its opposite end uprights 6, 6 which are operable in unison so that both ends are acted upon alike. Obviously there are numerous ways of obtaining this result, but for illustrative purposes I have shown a series of cams 61 between the back walls 3 and 8 of the two members, work support and tool guide carrier. These cams are shown fast upon stud shafts 62 which project through the back wall 8 of the upper member 7 and carry knobs 63 by means of which said cams may be rotated. Above the cams and secured to the back wall 3 of the lower member or work support are rollers 64, and it will be understood that rotation of the cams causes them to raise the upper member by engagement with these rollers. The cams 61 are preferably connected by means of a link 65 so that rotation of one cam will cause the others to rotate an equal amount.

Suitable clamping screws 66, preferably extending through the uprights of the upper member or tool guide carrier and clamping against the tracks 4, 4 of the work support, serve to hold the two parts in fixed relation when set, it being understood that these clamping screws are tightened after the upper member has been placed at the proper elevation above the work.

While my invention has been shown and described for use on drill presses, it will be understood that it can be used in any position and with any tool adapted to the purpose. Furthermore, other detail modifications and changes may be made in manufacturing my improved tool guiding jig without departing from the spirit and scope of the invention, and I do not wish to be understood as restricting myself except as required by the following claims when construed in the light of the prior art.

Having thus described the invention, what I claim is,

1. In a device of the character described, the combination of a work support forming a base adapted to seat upon a table or the like and in which a piece of work can be clamped, said base having an upward extension, a tool guide carrier above said work support and movable toward and away from the same upon said extension, and a tool guide adjustable in different directions in said carrier.

2. In a device of the character described, the combination of a work support forming a base adapted to seat upon a table or the like and in which a piece of work can be clamped, said base having a back providing opposite upright slideways, a tool guide carrier above said work support and movable toward and away from the same upon said slideway, and a tool guide adjustable in different directions in said carrier.

3. In a device of the character described, the combination of a work support, means for clamping a piece of work thereon, bridge supporting means on said work support at opposite sides of the work, a bridge movable transversely of itself and longitudinally of said supporting means, micrometer means on each of said supporting means for positioning said bridge, means for clamping the bridge independent of said positioning means, and a tool guide adjustable longitudinally of the bridge.

4. In a device of the character described, the combination of a work support, means for clamping a piece of work thereon, bridge supporting means on said work support at opposite sides of the work, a bridge movable transversely of itself and longitudinally of said supporting means, micrometer means on each of said supporting means for positioning said bridge, a tool guide on said bridge, micrometer means on said bridge for positioning said tool guide longitudinally thereof, and means for clamping said tool guide independently of said position means.

5. In a device of the character described, the combination of a work support with a back providing opposite upright slideways, means for clamping a piece of work on said support, a tool guide carrier body providing uprights slidably engaging said slideways of the work support, whereby the tool guide carrier and work support are adjustable toward and away from each other in otherwise fixed relation, and means for positioning a tool guide upon said carrier body in any direction parallel to the work support.

6. In a device of the character described, the combination with a support and a tool guide, of a micrometer on said support adapted to be operated independent of the tool guide and limit the movement of the tool guide, and means for clamping the tool guide against said micrometer.

7. In a device of the character described, the combination with a support and a tool guide, of a micrometer on said support adapted to be operated independent of the tool guide and limit movement of the tool guide, and means for moving the tool guide into the position thus determined.

8. In a device of the character described, the combination with a support and a tool guide, of a micrometer on said support adapted to be operated independent of the tool guide and limit movement of the tool guide, means for moving the tool guide into the position thus determined, and means for locking it there.

9. In a device of the character described, the combination of a work support, a bridge above said work support adjustable in a direction parallel thereto, micrometers at opposite ends of said bridge bar determining the position of said bridge, means opposite both micrometers for holding the bridge toward said micrometers, and means for clamping said bridge with respect to the work support.

10. In a device of the character described, the combination of a work support, means for clamping a piece of work thereon, a tool guide above said work support adjustable in a direction parallel thereto, a micrometer for determining the position of said tool guide, means for holding the tool guide toward said micrometer, and means for clamping said tool guide with respect to the work support.

11. In a device of the character described, the combination of a work support, a bridge above said work support adjustable in a direction parallel thereto, a micrometer for determining the position of said bridge, means for holding the bridge toward said micrometer, means for clamping said bridge with respect to the work support, and a tool guide adjustably mounted on said bridge.

12. In a device of the character described, the combination of a work support, a bridge above said work support adjustable in a direction parallel thereto, a micrometer for determining the position of said bridge, means for holding the bridge toward said micrometer, means for clamping said bridge with respect to the work support, a tool guide on said bridge adjustable longitudinally thereof, and micrometer means for positioning said tool guide.

13. In a device of the character described, the combination of a work support, a bridge above said work support adjustable in a direction parallel thereto, a micrometer for determining the position of said bridge, means for holding the bridge toward said micrometer, means for clamping said bridge with respect to the work support, a tool guide adjustably mounted on said bridge, a micrometer for determining the position of said tool guide, means for holding the tool guide toward said micrometer, and means for clamping said tool guide with respect to the bridge.

14. In a device of the character described, the combination of a work support, a bridge above said work support adjustable in a direction parallel thereto, micrometers at opposite ends of said bridge for determining the position of said bridge, means opposite both micrometers for holding the bridge toward said micrometers, means for clamping said bridge with respect to the work support, a tool guide adjustably mounted on said bridge, a micrometer for determining the position of said tool guide, means for holding the tool guide toward said micrometer, and means for clamping said tool guide with respect to the bridge.

15. In a device of the character described, the combination of a work support, supporting arms above said work support in parallel relation thereto, a bridge slidable transversely of itself and longitudinally of said arms, means for positioning said bridge on said arms, and a tool guide adjustable longitudinally of said bridge, whereby said tool guide may be positioned in any direction parallel to the work support by adjustment of the tool guide on the bridge and adjustment of the bridge on the arms.

16. In a device of the character described, the combination of a work support, supporting arms above said work support in parallel relation thereto, a bridge slidable transversely of itself and longitudinally of said arms, means for positioning said bridge on said arms, means for clamping the bridge to the arms, and a tool guide adjustable longitudinally of said bridge, whereby said tool guide may be positioned in any direction parallel to the work support by adjustment of the tool guide on the bridge and adjustment of the bridge on the arms.

17. In a device of the character described, the combination of a work support, a bridge above said work support adjustable in a direction parallel thereto, a micrometer for determining the position of said bridge, a spacing member between said micrometer and bridge, means for holding the bridge toward said micrometer, and means for clamping said bridge with respect to the work support.

18. In a device of the character described, the combination of a work support, means for clamping a piece of work thereon, a tool guide above said work support adjustable in a direction parallel thereto, a micrometer for determining the position of said tool guide, a spacing member between said micrometer and bridge, means for holding the tool guide toward said micrometer, and means for clamping said tool guide with respect to the work support.

19. In a device of the character described, the combination with a support and a tool guide, of a micrometer on said support adapted to be operated independent of the tool guide and limit the movement of the tool guide, and means for clamping the tool guide independent of said micrometer.

20. In a device of the character described, the combination of a work support, a bridge above said work support movable transversely thereof, a micrometer adapted to be operated independently of said bridge and limit the movement thereof, and means for clamping said bridge with respect to the work support independently of said micrometer.

21. In a device of the character described, the combination of a work support, a bridge above said work support movable transversely thereof, micrometers at opposite ends of said bridge adapted to be operated independently thereof and limit the movement of the bridge, and means for clamping said bridge with respect to the work support independently of said micrometers.

22. In a device of the character described, the combination of a work support, a bridge above said work support movable transversely thereof, a micrometer adapted to be operated independently of said bridge and limit the movement thereof, means for locking the bridge in position, a tool guide on said bridge movable longitudinally thereof, a micrometer on said bridge adapted to be operated independently of said tool guide and limit the movement thereof, and means for clamping said tool guide with respect to the bridge.

23. In a device of the character described, the combination of a work support, a bridge above said work support movable transversely thereof, micrometers at opposite ends of said bridge adapted to be operated independently thereof and limit the movement of the bridge, means for locking the bridge in position, a tool guide on said bridge movable longitudinally thereof, a micrometer on said bridge adapted to be operated independently of said tool guide and limit the movement thereof, and means for clamping said tool guide with respect to the bridge.

24. In a device of the character described, the combination of a work support, a bridge above said work support movable transversely thereof and supported at both ends, micrometers at opposite ends of said bridge for determining the position of said bridge, means for clamping said bridge with respect to the work support, a tool guide adjustably mounted on said bridge, a micrometer for determining the position of said tool guide, and means for clamping said tool guide with respect to the bridge.

25. In a device of the character described, the combination with a support and a tool guide, of a micrometer on said support adapted to be operated independent of the tool guide and limit the movement of the tool guide, and means for locking the tool guide in position.

26. In a device of the character described, the combination of a work support, a bridge above said work support movable transversely thereof, a micrometer adapted to be operated independently of said bridge and limit the movement thereof, and means for locking said bridge with respect to the work support.

27. In a device of the character described, the combination of a work support, a bridge above said work support movable transversely thereof, micrometers at opposite ends of said bridge adapted to be operated independently thereof and limit the movement of the bridge, and means for locking said bridge with respect to the work support.

In testimony whereof I have signed this specification in the presence of two subscribing witnesses.

JOSEPH BLAUSTEIN.

Witnesses:
HOWARD P. KING,
JANET A. AYERS.